(12) United States Patent
Lee

(10) Patent No.: US 12,203,563 B1
(45) Date of Patent: Jan. 21, 2025

(54) VALVE HAVING LOCKING FUNCTION

(71) Applicant: FLUONICS CORP., Wonju-si (KR)

(72) Inventor: Sang Seon Lee, Wonju-si (KR)

(73) Assignee: FLUONICS CORP., Wonju-si (KR)

( * ) Notice: Subject to any disclaimer, the term of this patent is extended or adjusted under 35 U.S.C. 154(b) by 88 days.

(21) Appl. No.: 17/935,114

(22) Filed: Sep. 25, 2022

Related U.S. Application Data

(63) Continuation of application No. PCT/KR2021/003716, filed on Mar. 25, 2021.

(30) Foreign Application Priority Data

Mar. 26, 2020 (KR) .......................... 10-2020-0037044

(51) Int. Cl.
*F16K 35/02* (2006.01)
*F16K 27/02* (2006.01)
*F16K 31/60* (2006.01)

(52) U.S. Cl.
CPC ........ *F16K 35/025* (2013.01); *F16K 27/0236* (2013.01); *F16K 27/0272* (2013.01); *F16K 31/60* (2013.01)

(58) Field of Classification Search
CPC .... F16K 35/025; F16K 35/10; F16K 27/0236; Y10T 137/7256
See application file for complete search history.

(56) References Cited

U.S. PATENT DOCUMENTS

| | | | | |
|---|---|---|---|---|
| 3,407,838 A * | 10/1968 | Boteler | ............... | F16K 27/0236 264/269 |
| 5,236,172 A | 8/1993 | Friemoth et al. | | |
| 5,295,660 A * | 3/1994 | Honma | ............... | F16K 27/0236 251/297 |
| 9,709,189 B2 * | 7/2017 | Matalon | ................ | F16K 35/025 |
| 2004/0222396 A1 * | 11/2004 | Miklo | ..................... | F16K 31/60 137/383 |
| 2012/0080628 A1 * | 4/2012 | Buergi | .................. | F16K 35/025 251/249.5 |

FOREIGN PATENT DOCUMENTS

| | | |
|---|---|---|
| JP | 2019-132379 A | 5/2017 |
| KR | 2020100006483 U | 6/2010 |
| KR | 10-1739599 B1 | 5/2017 |
| KR | 10-2019-0142968 A | 12/2019 |

OTHER PUBLICATIONS

English_Machine_Translation_KR20190142968 (Year: 2018).*
International Search Report of PCT/KR2021/003716 dated Jul. 1, 2021.
Written Opinion of the International Searching Authority of PCT/KR2021/003716 dated Jul. 1, 2021.

* cited by examiner

*Primary Examiner* — Kenneth Rinehart
*Assistant Examiner* — Nicole Gardner

(57) ABSTRACT

A valve comprises a hand wheel, a locking operation member inserted in a space of the hand wheel and a fixing locking member. The valve is locked when the locking operation member is combined with at least partial of the fixing locking member, the valve is unlocked when the locking operation member is separated from the fixing locking member, the locking operation member rotates in response to rotation of the hand wheel while the locking operation member is inserted in the hand wheel, and the fixing locking member is used for locking of the valve with fixed.

7 Claims, 10 Drawing Sheets

FIG. 11

| DIMENSION TABLE | | | |
|---|---|---|---|
| | DN25 | DN40 | DN50 |
| DN | 25 | 40 | 50 |
| L (min.) | 132 | 165 | 197 |
| L (max.) | 160 | 200 | 230 |
| R1 (min.) | 70 ~ 75 | 90 ~ 95 | 95 ~ 100 |
| R1 (max.) | 80 ~ 85 | 105 ~ 110 | 110 ~ 115 |
| R2 (min.) | 95 ~ 100 | 130 ~ 135 | 145 ~ 150 |
| R2 (max.) | 105 ~ 110 | 145 ~ 150 | 160 ~ 165 |
| R3 (min.) | 50 ~ 55 | 65 ~ 70 | 85 ~ 90 |
| R3 (max.) | 60 ~ 65 | 80 ~ 85 | 100 ~ 105 |
| H (min.) | 7 | 8 | 9 |
| H (max.) | 10 | 11 | 12 |

VALVE HAVING LOCKING FUNCTION

CROSS-REFERENCE TO RELATED APPLICATIONS

This application is a continuation application of PCT application PCT/KR2021/003716, which was filed on Mar. 25, 2021, and which claims priority from Korean Patent Application No. 10-2020-0037044 filed with the Korean Intellectual Property Office on Mar. 26, 2020. The disclosures of the above patent applications are incorporated herein by reference in their entirety.

TECHNICAL FIELD

The present disclosure relates to a valve having a locking function.

BACKGROUND ART

A valve opens/closes flowing of fluid. However, other person who is not a manager can manipulate arbitrarily the valve because conventional valve does not have a locking function.

SUMMARY

The present disclosure is to provide a valve realizing a locking function with a simple structure.

A valve according to an embodiment of the present disclosure includes a hand wheel; a locking operation member inserted in a space of the hand wheel; and a fixing locking member. Here, the valve is locked when the locking operation member is combined with at least partial of the fixing locking member, the valve is unlocked when the locking operation member is separated from the fixing locking member, the locking operation member rotates in response to rotation of the hand wheel while the locking operation member is inserted in the hand wheel, and the fixing locking member is used for locking of the valve with fixed.

A valve according to another embodiment of the present disclosure includes a hand wheel; and a locking operation member inserted in a space of the hand wheel. Here, locking of the valve is changed when the locking operation member moves in a direction of a center of the hand wheel or moves in an outward direction of the hand wheel, while the locking operation member is inserted in the space.

A locking operation member used for a locking operation according to an embodiment of the present disclosure includes a body; and an insertion member extended longitudinally from the body. Here, a space is formed in the body, projections are formed on a part of an inner surface of the body, the locking is achieved by combining the projections with locking projections of an external locking member, unlocking is realized when the projections are separated from the locking projections of the external locking member, and the combining or the separating of the projections and the locking projections are determined by moving of the insertion member.

In a valve of the present disclosure, the valve may be locked or unlocked by interlocking projections of a locking operation member with locking projections of a bonnet or separating the projections of the locking operation member from the locking projections. As a result, other people may not manipulate arbitrarily the valve.

BRIEF DESCRIPTION OF DRAWINGS

Example embodiments of the present disclosure will become more apparent by describing in detail example embodiments of the present disclosure with reference to the accompanying drawings, in which:

FIG. 11 is a view illustrating a table in which ratio of curves in FIG. 10 is recorded.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The present disclosure relates to a valve, e.g. diaphragm valve with a locking function. The valve may realize the locking function of the valve by controlling the valve in a direction of a rotation axis of the valve. In this case, the locking function is not achieved in a direction of a central axis of the valve.

Particularly, a hand wheel does not rotate in the direction of the rotation axis when the valve is locked, and the hand wheel may rotate in a clockwise direction or a counterclockwise direction when the valve is unlocked.

Hereinafter, various embodiment of the present disclosure will be described in detail with reference to accompanying drawings.

Figure 1:
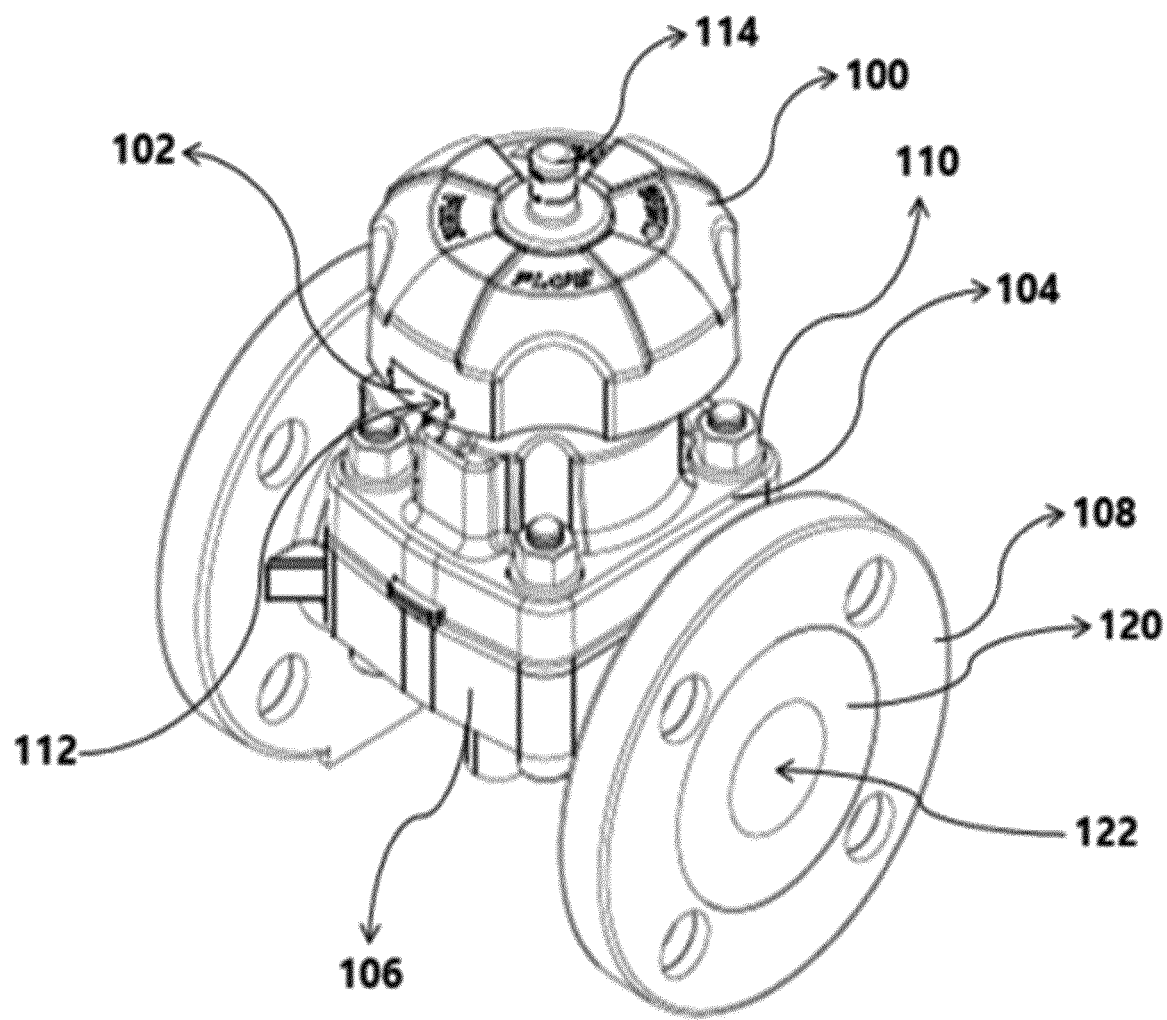
FIG. 1 is a perspective view illustrating unlocked valve according to an embodiment of the present disclosure.
Figure 2:
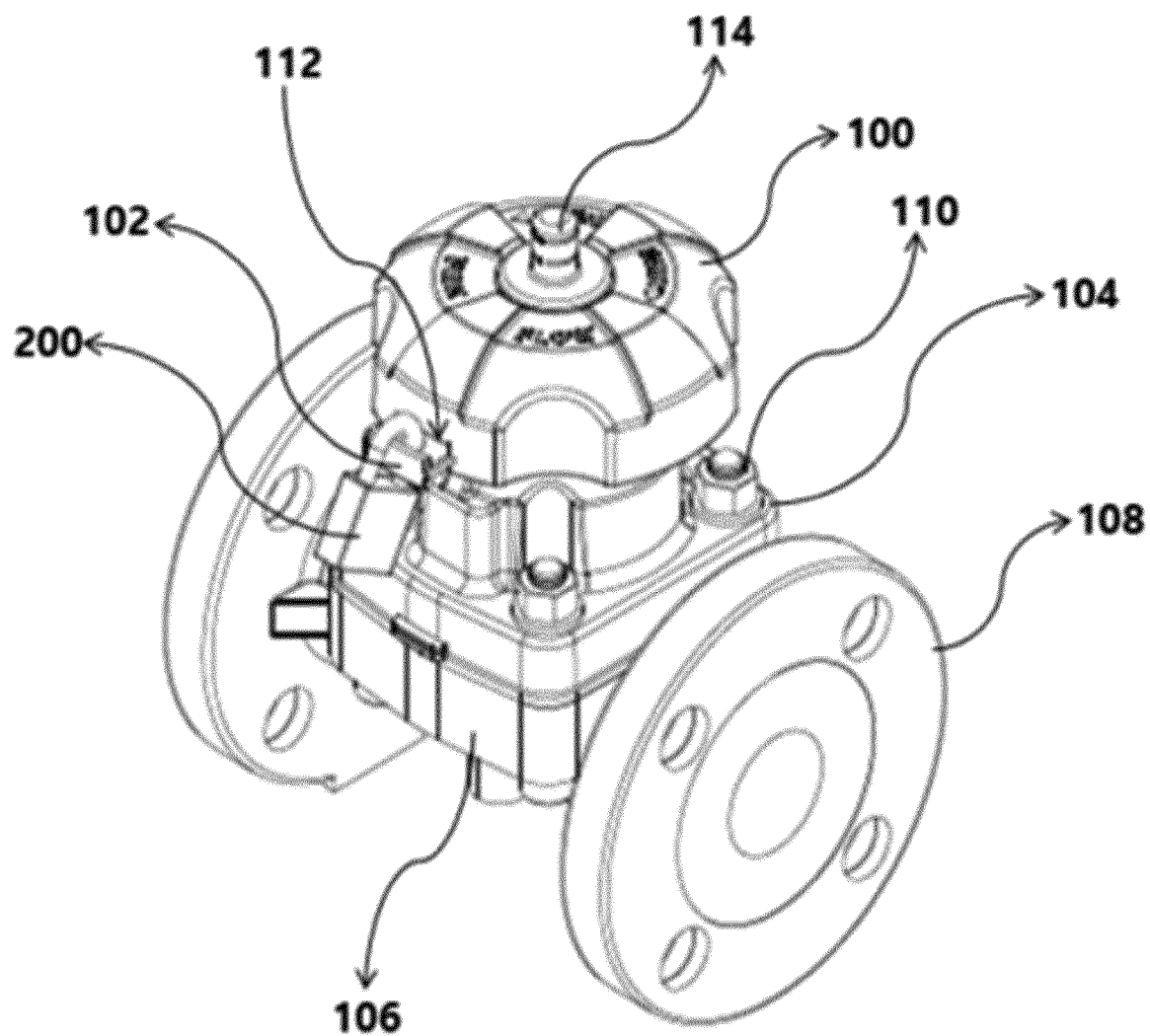
FIG. 2 is a perspective view illustrating locked valve according to an embodiment of the present disclosure.
Figure 3:
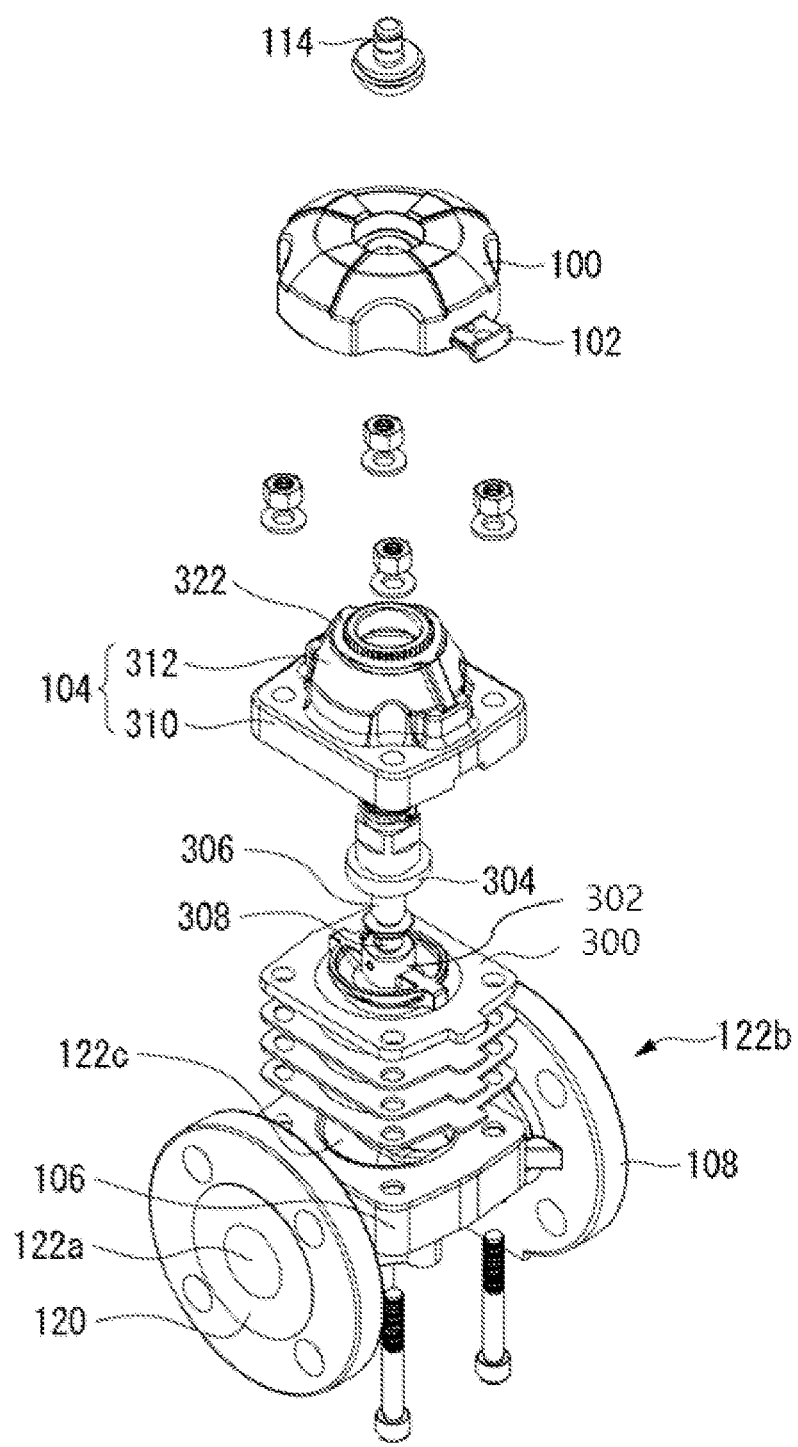
FIG. 3 is a view illustrating a disassembled structure of the valve according to an embodiment of the present disclosure.
Figure 4:
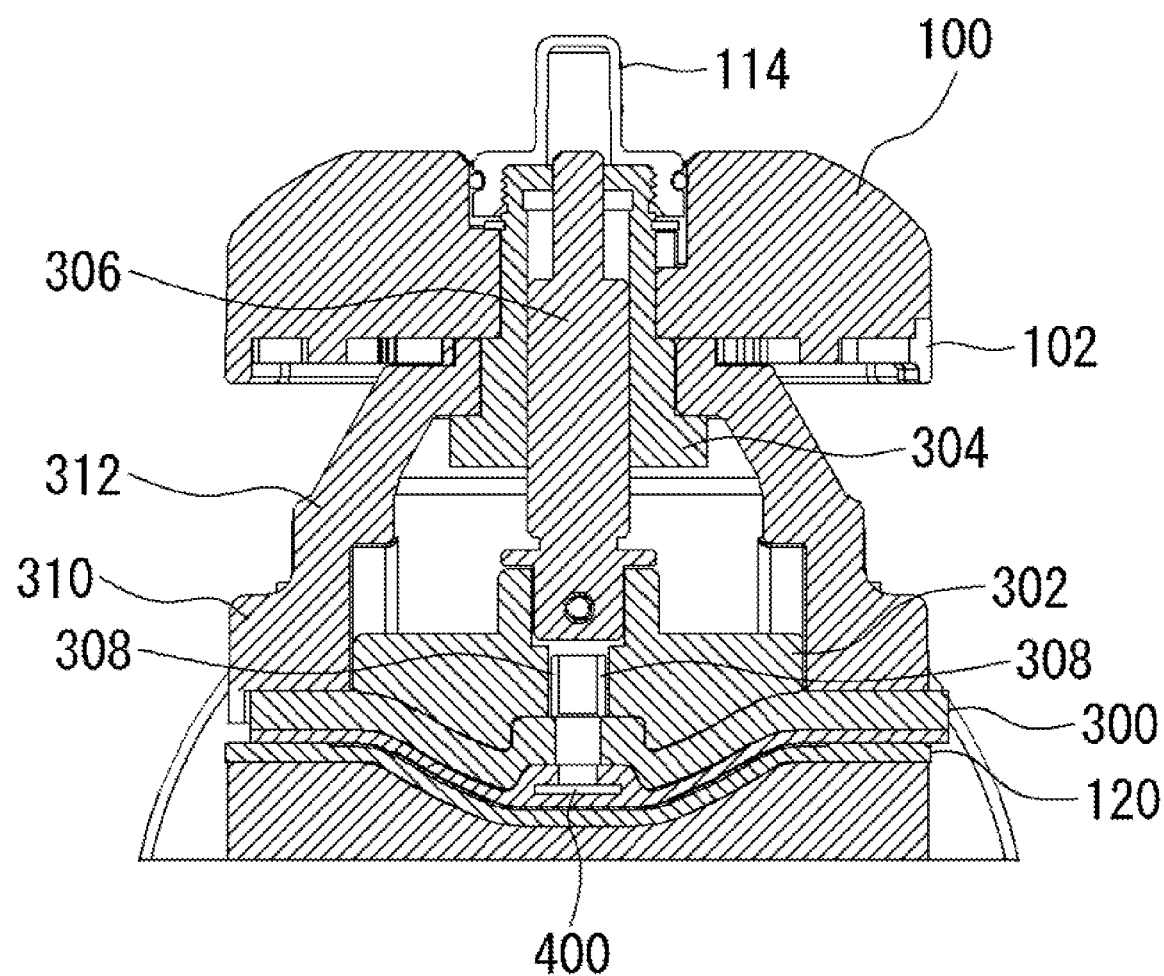
FIG. 4 is a sectional view illustrating schematically the valve according to an embodiment of the present disclosure.
Figure 9:
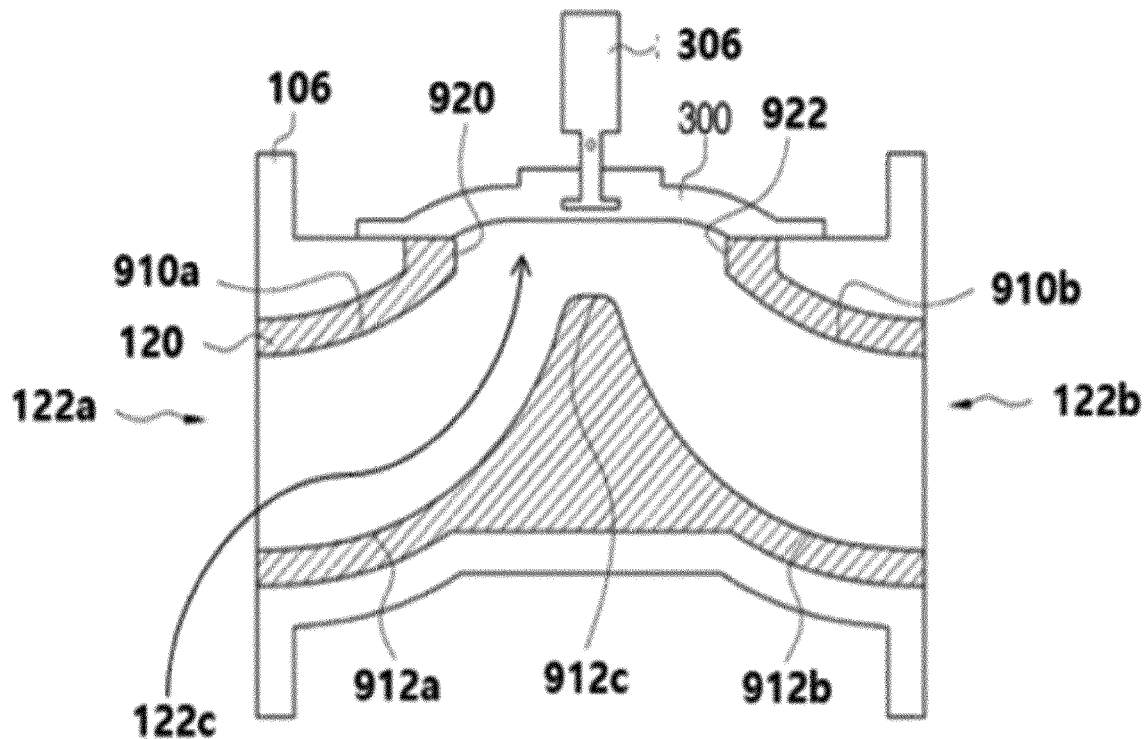
FIG. 9 to FIG. 10 are views illustrating a fluid flow space according to an embodiment of the present disclosure.
Figure 10:
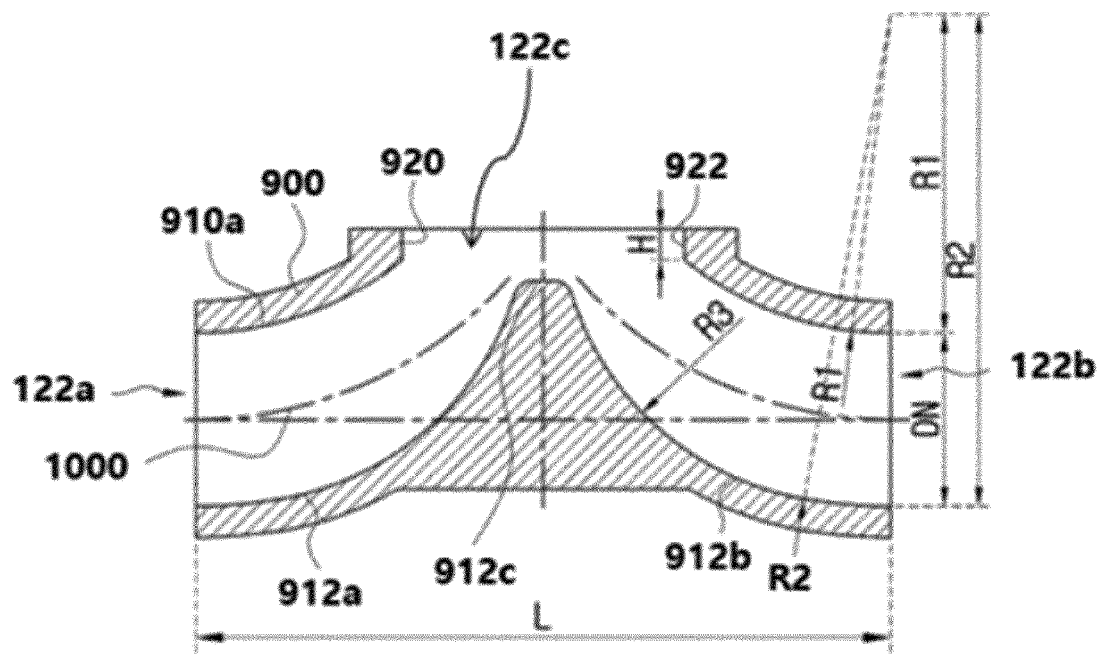

FIG. 1 is a perspective view illustrating unlocked valve according to an embodiment of the present disclosure, FIG. 2 is a perspective view illustrating locked valve according to an embodiment of the present disclosure, and FIG. 3 is a view illustrating a disassembled structure of the valve according to an embodiment of the present disclosure. FIG. 4 is a sectional view illustrating schematically the valve according to an embodiment of the present disclosure, and FIG. 5 to FIG. 8 are views illustrating operation of a locking operation device according to an embodiment of the present disclosure. FIG. 9 to FIG. 10 are views illustrating a fluid flow space according to an embodiment of the present disclosure, and FIG. 11 is a view illustrating a table in which ratio of curves in FIG. 10 is recorded.

In FIG. 1 to FIG. 4, a valve of the present embodiment is for example a diaphragm valve and may include a hand wheel 100, a locking operation member 102, a bonnet 104, a body 106, at least one flange member 108, a cap 114, a locking member 200, a diaphragm 300, a spindle bush 304, an up-and-down motion member 306, a buffer member 308 and a fixing member 400.

The hand wheel 100 controls opening/closing of the valve. The valve may be closed when a user rotates the hand wheel 100 in for example a clockwise direction, and the valve may be opened when the user rotates the hand wheel 100 in a counterclockwise direction. Fluid may flow through a fluid flow space 122 when the valve is opened.

In an embodiment, a space 112, e.g. hole may be formed at a part of the hand wheel 100, e.g. a side, and the locking operation member 102 may be inserted into the space 112. Here, the locking operation member 102 may be integrally combined with the hand wheel 100.

The locking operation member 102 is a member for realizing a locking function of the valve.

In an embodiment, the valve may be unlocked when the locking operation member 102 is wholly inserted into the space 112 of the hand wheel 100 as shown in FIG. 1, and so the user may open/close the valve by rotating the hand wheel 100 in the clockwise direction or counterclockwise direction.

The hand wheel 100 does not rotate, i.e. the valve is locked when a part of the locking operation member 102 is projected outside the hand wheel 100 as shown in FIG. 2. Accordingly, the locking operation member 102 is not completely inserted into the space 112 of the hand wheel 100 due to a locking member 200, e.g. a lock when the locking operation member 102 is fastened by the locking member 200. As a result, the hand wheel 100 does not rotate, and thus it is impossible to control arbitrarily opening/closing of the valve.

That is, the valve may be unlocked when the locking operation member 102 moves in a direction of a central part of the hand wheel 100, and the valve may be locked when the locking operation member 102 moves in an outward direction of the hand wheel 100. Detailed description concerning to the locking operation of the valve will be described below.

The bonnet 104 is combined with the body 106 by using for example a bolt and may cover elements for opening/closing of the fluid flow space 122. Here, the fluid flow space 122 means a space through which fluid flows and may include an inlet 122a, an outlet 122b and an opening/closing hole 122c (central part).

Flowing of the fluid is blocked when a part of a lower surface of the diaphragm 300 contacts with a lower central part 912c of a lower surface of the body 106 or a liner 120 through the opening/closing hole 122c. The fluid flows through the fluid flow space 122 when the part of the lower surface of the diaphragm 300 is separated from the lower central part 912c of the lower surface of the body 106 or the liner 120.

That is, the flowing of the fluid may be opened/closed by moving up-and-down a central part of the diaphragm 300. Here, ends of the diaphragm 300 may be combined with the body 106. As a result, only the central part of the diaphragm 300 moves up-and-down when the diaphragm 300 is pulled or pushed, i.e. stroke of the diaphragm 300 is changed. On the other hand, the diaphragm 300 may be formed with a single layer or multiple layers, e.g. four layers as shown in FIG. 3.

The spindle bush 304, the up-and-down motion member 306, the buffer member 308 and the fixing member 400 are used for controlling moving of the diaphragm 300.

The spindle bush 304 is combined with the hand wheel 100 as shown in FIG. 3 and FIG. 4, and thus it may rotate in response to rotation of the hand wheel 100. This spindle bush 304 may be extended to the bonnet 104 with inserted into an inner space of the hand wheel 100.

One end of the up-and-down motion member 306 may be combined with the spindle bush 304 and the other end of the up-and-down motion member 306 may be combined with a compressor 302.

In an embodiment, the spindle bush 304 and the up-and-down motion member 306 may be combined by using a bolt. As a result, the up-and-down motion member 306 moves up-and-down when the spindle bush 304 rotates. For example, the up-and-down motion member 306 may descend to fall a central part of the diaphragm 300 when the spindle bush 304 rotates by rotating the hand wheel 100 in a clockwise direction, and it may ascend to rise the central part of the diaphragm 300 when the spindle bush 304 rotates by rotating the hand wheel 100 in a counterclockwise direction.

This up-and-down motion member 306 may be combined with the compressor 302 through for example a pin, and one end of the up-and-down motion member 306 may be extended through a hole 322 of a top part of the bonnet 104.

The fixing member 400, e.g. a bolt fixes the diaphragm 300. Here, an end part of the up-and-down motion member 306 applies direct impact to the fixing member 400 if the buffer member 308 does not exist, the buffer member 308 may locate between the up-and-down motion member 306 and the fixing member 400 so that the direct impact is not applied to the fixing member 400.

The body 106 is a body of the valve and may be formed of plastic or metal.

In an embodiment, the body 106 may be formed of an engineering plastic, for example polyphenylene ethers resin composition including polyphenylene ethers resin and polystyrene resin. Of course, the body 106 may be formed of polyimide, polysulfone, poly phenylene sulfide, polyamide imide, polyacrylate, polyether sulfone, polyether ether ketone, polyether imide, liquid crystal polyester, olpyether ketone, etc. and their combination, as the engineering plastic.

In another embodiment, the body 106 may be formed by mixing a glass fiber with Polyvinyl Chloride PVC, polypropylene PP, Poly Phenylene sulfide PPS, Polyphthalamide PPA, Polyamide PA6, Polyamide PA66, Polyketone POK or Polyethylene PE. As a result, strength, impact resistance and mechanical feature of the body 106 may be enhanced.

In still another embodiment, the body 106 may be formed by mixing a glass fiber and a carbon fiber with for example, a PVC, a PP, a PPS, a PPA, a PA6, a PA66, a POK or a PE.

In still another embodiment, the body 106 may be formed by mixing a glass fiber, a carbon fiber and a graphite fiber with for example, a PVC, a PP, a PPS, a PPA, a PA6, a PA66, a POK or a PE.

The liner 120 is formed inside the body 106, and the fluid flow space 122 through which fluid flows may be formed inside the liner 120.

In an embodiment, the liner 120 may be formed of a fluorine resin. The fluorine resin means every resin including fluorine in a molecule, and it includes a Polytetrafluoroethylene, PTFE, a Polychlorotrifluoroethylene PCTFE or a Perfluoroalkoxy alkane PFA, etc. This fluorine resin has excellent heat resistance, excellent chemical resistance, excellent electric insulation, small friction coefficient, and does not have adhesion. That is, friction coefficient of the liner 120 is small when the liner 120 is formed of the fluorine resin, and thus change of velocity of a moving fluid by a laminar flow may be minimized. In other words, difference of velocity of fluid flowing through an upper region or a lower region in the fluid flow space 122 and velocity of fluid flowing through a central region in the fluid flow space 122 may be minimized, based on specific point.

In an embodiment, a metal member (not shown) may be formed in the body 106 through for example an injection molding. As a result, strength of the body 106 may be enhanced.

A flange member 108 may be formed at an end part of the body 106. The flange member 108 may be combined with a flange member of a pipe, and so the valve may be combined with the pipe.

In an embodiment, the flange member 108 may be formed of plastic and a metal member (not shown) may be included in the flange member 108.

Hereinafter, the locking function will be described in detail.

The bonnet 104 may include a bonnet body 310 and a bonnet locking member 312 as shown in FIG. 3.

The bonnet body 310 may have various shapes, e.g. a rectangular shape and be combined with the body 106.

The bonnet locking member 312 may be projected from the bonnet body 310 and have smaller width than the bonnet body 310.

Figure 5:
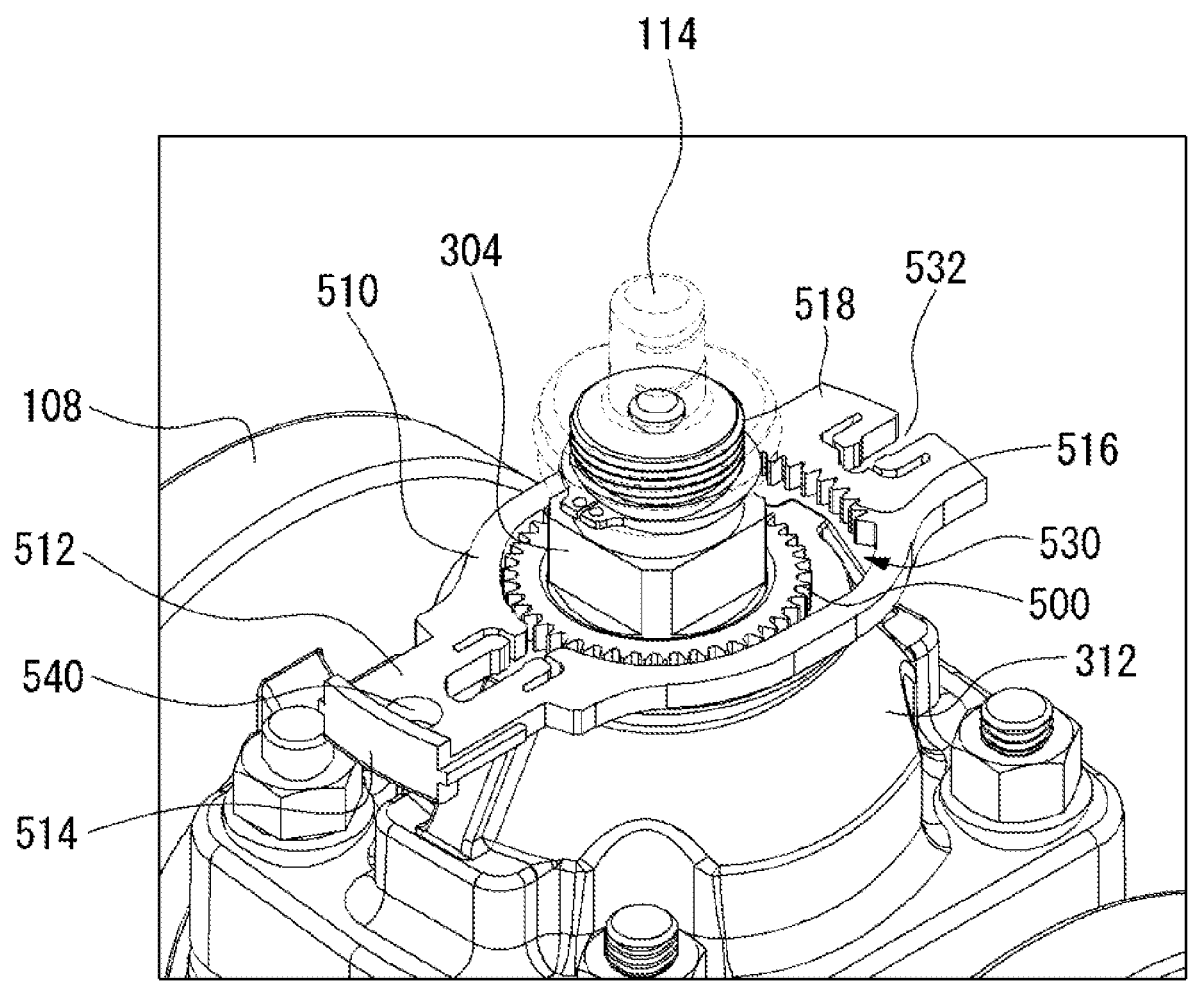
FIG. 5 to FIG. 8 are views illustrating operation of a locking operation device according to an embodiment of the present disclosure.

In an embodiment, a hole 322 into which the spindle bush 304 is inserted may be formed inside an end part of the bonnet locking member 312 and a locking projection may be formed on an outer surface of the end part of the bonnet locking member 312, as shown in FIG. 5. Here, the locking projection 500 may have a triangular shape like a screw thread, but it is not limited to have the triangular shape as long as it interlocks with the locking operation member 102, e.g. it may have a rectangular shape. The bonnet 104 may be called as a fixing locking member because the bonnet 104 is used for a locking function while it is fixed.

The locking projection 500 may interlock with a projection 516 of the locking operation member 102. Here, the locking projection 500 is formed on whole of the outer surface of the end part of the bonnet locking member 312, but it may be formed on a part of the outer surface of the end part of the bonnet locking member 312 as long as it interlocks with the projection 516 of the locking operation member 102.

Figure 7:
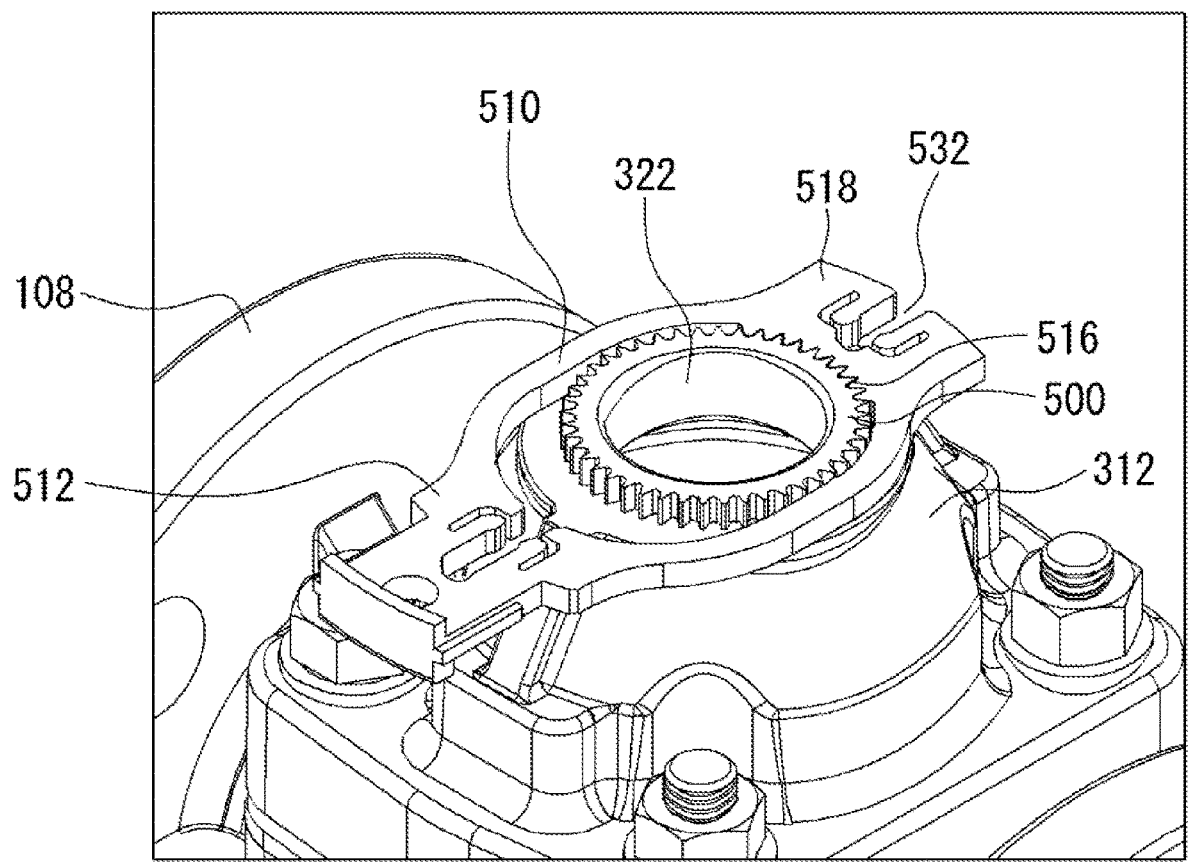
Figure 8:
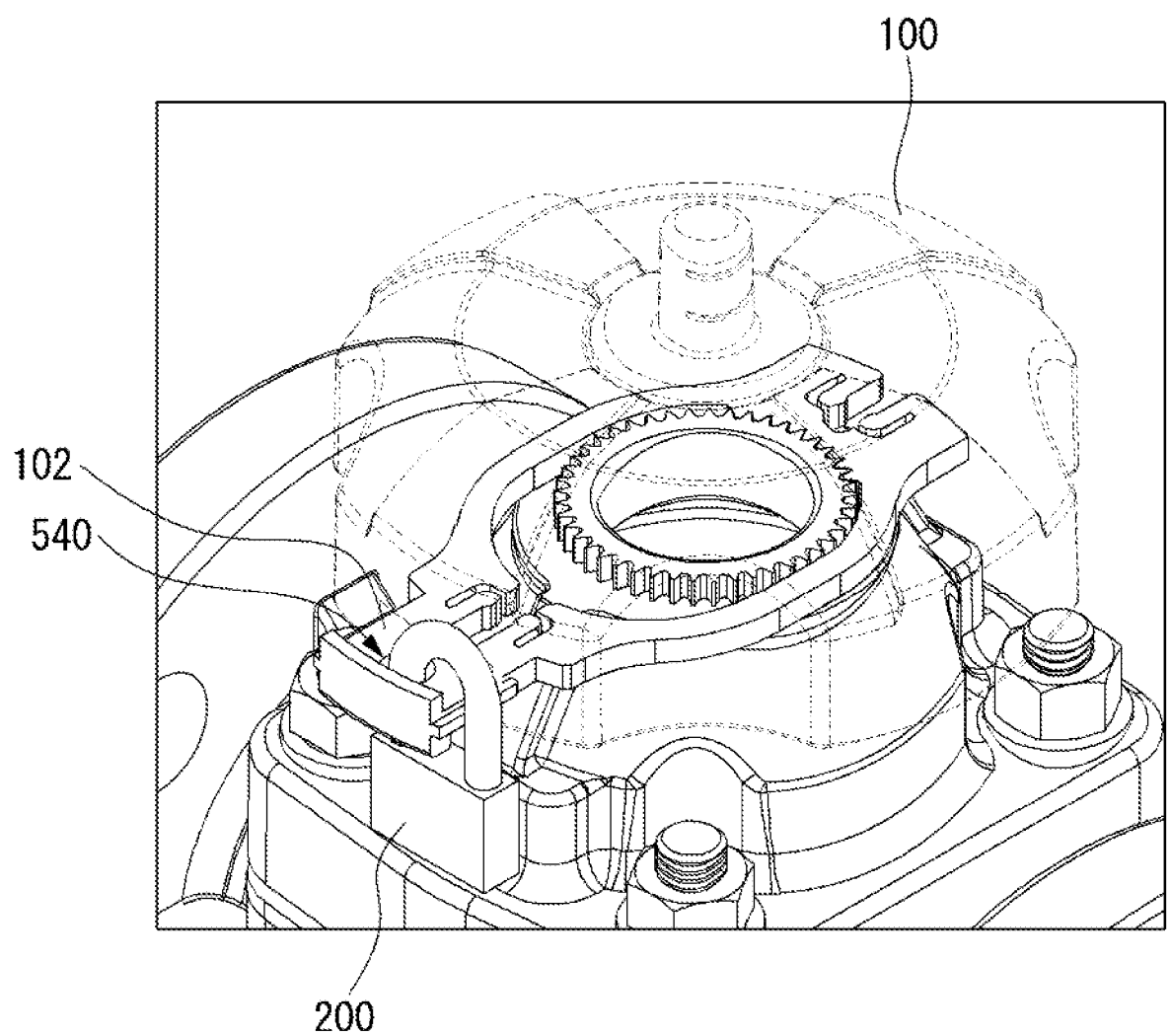

For example, the locking projections 500 of the bonnet locking member 312 may be combined with the projections 516 of an inner surface of the locking operation member 102 as shown in FIG. 7 and FIG. 8. Here, the hand wheel 100 does not rotate though the user applies a force to the hand wheel 100 to the rotate the hand wheel 100 because the bonnet 104 is fixed. That is, the valve is locked.

Figure 6:
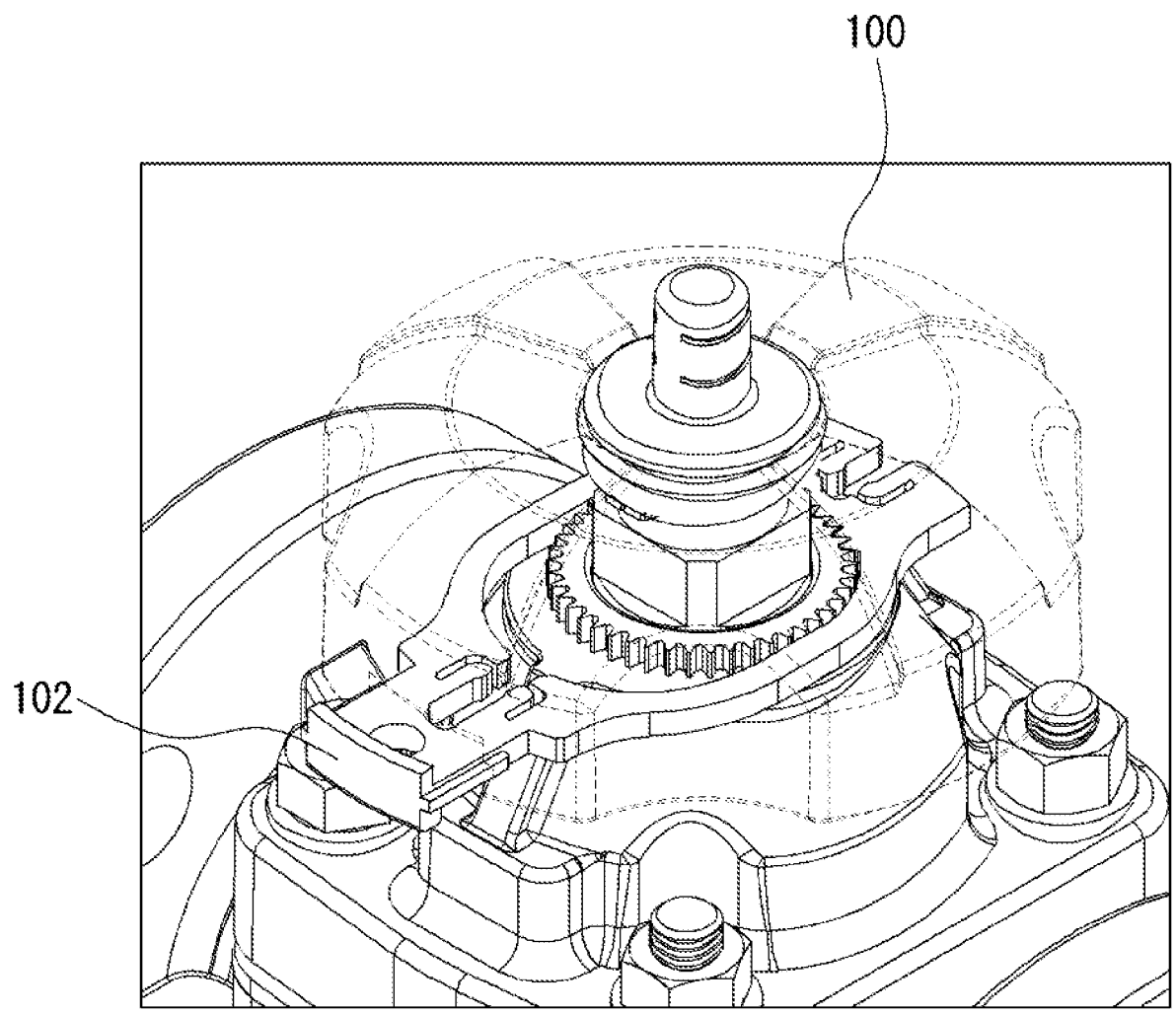

Whereas, the projection 516 of the locking operation member 102 is separated from the locking projection 500 of the bonnet locking member 312 as shown in FIG. 5 and FIG. 6 when the user pushes the locking operation member 102 in an inward direction, i.e. a direction of a center of the hand wheel 100. As a result, the valve is unlocked, and thus the user may open/close flowing of fluid by rotating the hand wheel 100.

To perform this operation, a space 530 may be formed inside of the locking operation member 102, the projection 516 may be formed on a part of an inner surface of the locking operation member 102, and the other part of the inner surface of the locking operation member may be flat. As a result, the locking operation member 102 does not interlock with the bonnet locking member 312 though the locking projection 500 of the bonnet locking member 312 contacts with a flat part of the locking operation member 102 as shown in FIG. 5. Accordingly, the locking operation member 102 rotates together with the hand wheel 100 while it is inserted in the hand wheel 100 through a side of the hand wheel 100, when the user rotates the hand wheel 100.

The locking operation member 102 may include a body 510, an insertion member 512, a cover member 514 and a projection supporter 518.

The space 530 may be formed inside the body 510, the projection 516 may be formed on a part of the inner surface of the body 510 and the other part of the inner surface of the body 510 may be flat. Of course, the other part may not be flat but have an uneven structure as long as it does not interlock with the locking projection 500.

The insertion member 512 is inserted in the space 112 of the hand wheel 100 and it may move in a forward direction or a backward direction in the space 112 depending on user's control.

A hole 540 into which a ring of the locking member 200 is inserted may be formed on a part of the insertion member 512 as shown in FIG. 7 and FIG. 8.

The cover member 514 may cover the space 112 as shown in FIG. 1 and it may be integrally combined with the hand wheel 100 in the space 112.

At least partial of the cover member 514 and the insertion member 512 may be projected outside of the hand wheel 100 when the user pulls the cover member 514 in an outward direction.

The cover member 514 may be disposed with an outer surface of the hand wheel 100 in coplanar as shown in FIG. 1 when the user pushes the cover member 514 in the direction of the center of the hand wheel 100.

The projection supporter 518 may be formed at a rear part of the projection 516 to support the projection 516 and an incision section 532 may be formed on a part of the projection supporter 518.

The incision section 532 may give elasticity to the projection 516.

Briefly, in the valve of the present embodiment, the locking projection 500 formed on an end part of the bonnet 104 interlocks the projection 516 of the locking operation member 102 when the user pulls the locking operation member 102 in an outward direction of the hand wheel 100, thereby locking the valve. The locking projection 500 of the bonnet 104 is separated from the projection 516 of the locking operation member 102 when the user pushes the locking operation member 102 in the direction of the center of the hand wheel 100, thereby unlocking the valve. That is, the locking of the valve may be controlled in a direction of a rotation axis. However, the locking function may not be realized in a central axis (vertical axis). As a result, the valve may have simple locking structure.

In above description, the locking projection 500 is formed on the outer surface of the top part of the bonnet 104. However, extra member combined with the bonnet 104 may exist, a locking projection may be formed on the extra member and the locking projection may interlocks with the projection 516 of the locking operation member 102.

In above description, the locking projection 500 of the bonnet 104 interlocks with the projection 516 of the locking operation member 102. However, a groove or a hole may be formed on the bonnet 104 and a projection of the locking operation member 102 may be inserted in the groove or the hole. Of course, a groove or a hole may be formed on the locking operation member 102 and a projection of the bonnet 104 may be inserted in the groove or the hole.

In an embodiment, a projection may be inserted in a groove or a hole of the bonnet 104 while the groove and the hole is formed on the top part of the bonnet 102 and a projection is formed on a lower surface of the locking operation member 102. Of course, a groove or a hole may be formed on the lower surface of the locking operation member 102 and a projection of the bonnet 104 may be inserted in the lower surface of the locking operation member 102. In this case, to lock or unlock the valve, the locking operation member 102 may move in and an upward-downward direction.

Hereinafter, the fluid flow space 122 will be described in detail.

In FIG. 9 and FIG. 10, the fluid flow space 122 of the present embodiment may have a streamlined shape in a direction from an inlet 122a or an outlet 122b to a central part 122c corresponding to a diaphragm 300.

Ideally, maximum fluid transfer amount may be achieved when the fluid flow space 122 has the streamlined shape from the inlet 122a to the central part 122c and from the central part 122c to the outlet 122b. However, it is difficult to manufacture the valve if an end part of the liner 120 corresponding to the central part 122c is very sharp, and thus end parts 920 and 922 of the liner 120 corresponding to the central part 122c should be vertically formed. However, the end parts 920 and 922 formed vertically are formed with minimum length H, for example may have a length less than 12 mm.

Specially, the fluid flow space 122 may have the streamlined shape from the inlet 122a or the outlet 122b in a direction from the inlet 122a or the outlet 122b to the central part 122c. That is, a curve starts from the inlet 122a or the outlet 122b.

The fluid flow space in the conventional valve has a straight line from the inlet or the outlet to specific point and is vertically formed from the specific point to a central part, and thus a vertical part operates as an obstacle for hindering the fluid flow. Accordingly, fluid transfer amount per hour becomes smaller.

In the valve of the present disclosure, the fluid flow space 122 has the streamlined shape from the inlet 122a or the outlet 122b in a direction from the inlet 122a or the outlet 122b to the central part 122c. Accordingly, an obstacle for hindering fluid flow does not exist in the fluid flow space 122, and so fluid transfer amount per hour is considerably high.

Flow transfer amount of the conventional valve when the vertical part is modified to a streamlined shape is higher than that of the valve including the vertical part. However, the flow transfer amount per hour of the conventional valve is very smaller than that of the valve of the present disclosure which has the streamlined shape from the inlet 122a or the outlet 122b in a direction from the inlet 122a or the outlet 122b to the central part 122c.

That is, since the curve of the fluid flow space 122 starts from the inlet 122a or the outlet 122b in the valve of the invention, the fluid transfer amount per hour is very high compared with in the conventional valve. In other words, a CV valve may be considerably enhanced.

In an embodiment, a width of the fluid flow space 122 may become smaller in a direction from the inlet 122a or the outlet 122b to the central part 122c. The diaphragm 300 rises or descends in a high range in the event that the fluid flow space 122 has the same width in the direction from the inlet 122a or the outlet 122b to the central part 122c, and thus an opening-closing operation is normally performed only when the hand wheel 100 for controlling the diaphragm 300 is rotated by for example maximum seven and a half times. The diaphragm 300 rises or descends in relative small range when the width of the fluid flow space 122 becomes smaller in the direction from the inlet 122a or the outlet 122b to the central part 122c. Accordingly, the opening-closing operation may be smoothly performed though the hand wheel 100 for controlling the diaphragm 300 is rotated by for example four times.

In view of the liner 120 not the fluid flow space 122, a first inner upper surface line 910a, a first inner lower surface line 912a, a second inner upper surface line 910b and a second inner lower surface line 912b may have the streamlined shape.

Both sides of a lower central part 912c of the liner 120 contacted with the diaphragm 300 may have a curved shape for the purpose of smooth flow of the fluid.

In the valve of the present disclosure, a curvature of the fluid flow space 122 may be determined in consideration of fluid flow and a manufacture process. The conventional valve is produced with multiple liners because the fluid flow space has a long-length vertical part. However, the valve of the present disclosure may be manufactured with single liner, and the liner is designed with proper curvature ratio. As a result, productivity of the conventional valve is deteriorated, but productivity of the valve of the present disclosure may be enhanced.

In the fluid flow space 122, a radius of an imaginary center curve 1000, a radius of a curve formed by an inner upper surface, a radius of a curve formed by an inner lower surface, a diameter of the inlet 122a or the outlet 122b of the fluid flow space 122, a height of the vertical part adjacent to the central part 122c and a distance between the inlet 122a and the outlet 122b are respectively defined as R, R1, R2 or R3, DN, H and L. It is assumed that a left space of the fluid flow space 122 is identical to a right space of the fluid flow space 122.

In an embodiment, the inner upper surface may have a curve which has different curvature from the radius R of the imaginary center curve 1000 of the fluid flow space 122. That is, the curve of the inner upper surface may have the curvature different from the imaginary center curve 1000 of the fluid flow space 122.

However, if the distance L is more than a predetermined value, the curve of the inner upper surface may include two curves having different curvature to manufacture easily the valve. Here, a curvature of a curve near to the diaphragm 300 is higher than that of another curve, in the two curves, and curvatures of the two curves may be different from a curvature of the imaginary center curve 1000. This is for removing easily single core inserted into the fluid flow space 122 when the liner 120 is manufactured.

For example, the inner upper surface may have one curve when the distance L is less than 230 mm, and it may have two curves when the distance L is higher than 230 mm.

Referring to Table in FIG. 11, in the event that the inner upper surface have one curve, a ratio of the radius R1 of the curve of the inner upper surface and the distance L in a DN25 valve may be in the range of 0.44(70/160) to 0.64 (85/132), a ratio of the radius R1 of the curve and the distance L in a DN40 valve may be in the range of 0.45(90/200) to 0.67(110/165), and a ratio of the radius R1 of the curve and the distance L in a DN50 valve may be in the range of 0.41(95/230) to 0.58(115/197). In case of a DN150 valve (not shown in Table), the distance L may be in the range of 406 to 480 and the radius R1 may have 170, R1/L may be more than 0.354(170/480).

That is, the ratio of the R1 and the distance L may be in the range of 0.354(170/480) to 0.67(110/165). Here, DN25 means that the diameter of the inlet 122a or the outlet 122b is 25 mm(Φ), DN40 indicates that the diameter of the inlet 122a or the outlet 122b is 40 mm(Φ), and DN50 means that the diameter of the inlet 122a or the outlet 122b is 50 mm(Φ).

A curve of the inner lower surface may include a first curve (radius R2) corresponding to the inlet 122a or the outlet 122b and a second curve (radius R3) near to the diaphragm 300, i.e. two curves. Here, a curvature of the first curve is different from that of the second curve, and the first curve and the second curve may have different curvature from the imaginary center curve 1000 (radius R) in the fluid flow space 122. On the other hand, R3 does not exist if the distance L is very great.

A ratio of R2 and the distance L may be in the range of 0.59(95/160) to 0.83(110/132) in the DN25 valve, be in the range of 0.65(130/200) to 0.91(150/165) in the DN40 valve, and be in the range of 0.63(145/230) to 0.84(165/197) in the DN 50 valve. That is, the ratio of R2 and the distance L may be in the range of 0.59(95/160) to 0.91(150/165).

A ratio of R3 and the distance L may be in the range of 0.31(50/160) to 0.49(65/132) in the DN25 valve, be in the range of 0.33(65/200) to 0.52(85/165) in the DN40 valve, and be in the range of 0.37(85/230) to 0.53(105/197) in the DN 50 valve. That is, the ratio of R3 and the distance L may be in the range of 0.31(50/160) to 0.53(105/197).

A ratio of R2 and R3 may be in the range of 1.46(95/65) to 2.2(110/50) in the DN25 valve, be in the range of 1.53(130/85) to 2.31(150/65) in the DN40 valve, and be in the range of 1.38(145/105) to 1.94(165/85) in the DN 50 valve. That is, the ratio of R2 and R3 may be in the range of 1.38(145/105) to 2.2(110/50).

A ratio of R1 and R2 may be in the range of 0.64(70/110) to 0.89(85/95) in the DN25 valve, be in the range of 0.6(90/150) to 0.85(110/130) in the DN40 valve, and be in the range of 0.58(95/165) to 0.79(115/145) in the DN 50 valve. That is, the ratio of R1 and R2 may be in the range of 0.58(95/165) to 0.89(85/95).

A ratio of R1 and R3 may be in the range of 1.08(70/65) to 1.7(85/50) in the DN25 valve, be in the range of 1.06(90/85) to 1.69(110/65) in the DN40 valve, and be in the range of 0.91(95/105) to 1.35(115/85) in the DN 50 valve. That is, the ratio of R1 and R3 may be in the range of 0.91(95/105) to 1.7(85/50).

The height H of the vertical part near to the diaphragm 300 differs depending on size of the valve, but may be in the range of 7 mm to 12 mm.

On the other hand, the DN25 valve, the DN40 valve and the DN50 valve are mentioned above, but the above ratios may be also applied to different size of valves.

Briefly, in the valve of the present disclosure, the fluid flow space 122 may have the streamlined shape in a direction from the inlet 122a or the outlet 122b to the central part 122c corresponding to the diaphragm 300. Specially, the curve starts from the inlet 122a or the outlet 122b. Accordingly, fluid transfer amount per hour may be enhanced.

In the above, the left space and the right space of the fluid flow space 122 are the same structure and are symmetrically formed, but they may have different structure. Nevertheless, the left space and the right space may have streamlined space, respectively.

Components in the embodiments described above can be easily understood from the perspective of processes. That is, each component can also be understood as an individual process. Likewise, processes in the embodiments described above can be easily understood from the perspective of components.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A valve comprising:
a hand wheel;
a locking operation member inserted in a space of the hand wheel; and
a fixing locking member,
wherein the valve is locked when the locking operation member is combined with at least partial of the fixing locking member, the valve is unlocked when the locking operation member is separated from the fixing locking member,
the locking operation member rotates in response to rotation of the hand wheel while the locking operation member is inserted in the hand wheel, the fixing locking member is used for locking of the valve when fixed,
at least one projection is formed on a part corresponding to a side of the fixing locking member of inner surfaces of the locking operation member but is not formed on the other part of the inner surface, a locking projection is formed on an outer surface of the fixing locking member,
the projection of the locking operation member is separated from the locking projection of the fixing locking member when the locking operation member moves in a direction of a center of the hand wheel through a space formed on a side of the hand wheel, thereby unlocking the valve,
the projection of the locking operation member interlocks with the locking projection of the fixing locking member when the locking operation member moves in an outward direction of the hand wheel, thereby locking the valve,
a hole is formed on a part of the locking operation member, and at least part of a locking member is inserted in the hole to lock the valve while the locking operation member is projected outside the handwheel,
wherein a projection supporter is formed at a rear part of the projection of the locking operation member to support the projection and an incision section is formed on a part of the projection supporter.

2. The valve of claim 1, wherein the fixing locking member is a bonnet, and wherein the locking operation member interlocks with the fixing locking member in a rotation direction of the hand wheel, and the locking operation member realizes a locking function in the rotation direction of the hand wheel but does not realize the locking function in a central axis (vertical axis) of the valve.

3. The valve of claim 2, wherein fluid flowing of a fluid flow space is opened/closed by rotating the hand wheel in a clockwise direction or counterclockwise direction,
the locking projection is formed on an outer surface of a top part of the bonnet, and the valve is locked when the projections of the locking operation member is combined with the locking projections of the top part of the bonnet.

4. The valve of the claim 2, wherein the locking operation member includes:

a body;

an insertion member extended longitudinally from the body;

a cover member formed at an end part of the insertion member; and the projection supporter, wherein the space is formed in the body, and the hole into which a ring of the locking member is inserted is formed on a part of the insertion member, wherein the locking operation member is not exposed outside of the hand wheel when the valve is unlocked, and a part of the insertion member in the locking operation member and the cover member is exposed outside of the hand wheel when the valve is locked.

5. The valve of claim 2, further comprising:

a body combined with the bonnet, a fluid flow space being formed in an inner surface of the body;

a spindle bush combined with the hand wheel inside the hand wheel;

an up-and-down motion member combined with the spindle bush;

a compressor combined with the up-and-down motion member;

a diaphragm combined with the compressor;

a fixing member for fixing the diaphragm; and a buffer member located between the up-and-down motion member and the fixing member, wherein the spindle bush rotates when the hand wheel rotates, and the up-and-down motion member moves up-and-down in response to rotation of the spindle bush to change the stroke of the diaphragm, and wherein the diaphragm is formed with multi layers.

6. The valve of claim 2, further comprising:

a body combined with the bonnet; and a liner formed on an inner surface of the body, and wherein a fluid flow space through which fluid flows is formed inside the liner, an internal surface of the liner corresponding to the fluid flow space has a streamlined shape from an inlet in a direction from the inlet to a central part.

7. A locking operation member used for locking a valve comprising:

a body; and an insertion member extended longitudinally from the body, wherein a space is formed in the body, projections are formed on a part of an inner surface of the body, but are not formed on the other part of the inner surface of the body, the locking is achieved by combining the projections with locking projections of an external locking member, unlocking is realized when the projections are separated from the locking projections of the external locking member, and the combining or the separating of the projections and the locking projections are determined by moving of the insertion member, the projections are formed on a part corresponding to a side of the external locking member of inner surfaces of the body, the locking projections are formed on an outer surface of the external locking member, the projections of the body are separated from the locking projections of the external locking member when the insertion member moves in a direction of a center of a hand wheel through the space formed in the body, thereby unlocking the valve, the projections of the body interlock with the locking projections of the external locking member when the insertion member moves in an outward direction of the hand wheel, thereby locking the valve, a hole is formed on a part of the insertion member, and at least part of a locking member is inserted in the hole to lock the valve while the external locking operation is projected outside the handwheel, wherein a projection supporter is formed at a rear part of the projection of the external locking member to support the projections and an incision section is formed on a part of the projection supporter.

\* \* \* \* \*